US012739241B2

(12) United States Patent
Son et al.

(10) Patent No.: US 12,739,241 B2
(45) Date of Patent: Sep. 15, 2026

(54) APPARATUS AND METHOD FOR MANAGING CLOUD COMPUTING INFRASTRUCTURE ACCESS BASED ON DYNAMIC PARALLEL NODES

(71) Applicant: ELECTRONICS AND TELECOMMUNICATIONS RESEARCH INSTITUTE, Daejeon (KR)

(72) Inventors: Seok-Ho Son, Daejeon (KR); Dong-Jae Kang, Daejeon (KR); Byoung-Seob Kim, Sejong-si (KR); Soo-Young Kim, Daejeon (KR); Yun-Kon Kim, Daejeon (KR); Seung-Jo Bae, Daejeon (KR); Byeong-Thaek Oh, Sejong-si (KR); Young-Woo Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 28 days.

(21) Appl. No.: 18/970,856

(22) Filed: Dec. 5, 2024

(65) Prior Publication Data

US 2025/0286883 A1 Sep. 11, 2025

(30) Foreign Application Priority Data

Mar. 6, 2024 (KR) ........................ 10-2024-0031876

(51) Int. Cl.
*H04L 9/40* (2022.01)

(52) U.S. Cl.
CPC .......... *H04L 63/083* (2013.01); *H04L 63/108* (2013.01)

(58) Field of Classification Search
CPC ........... H04L 63/0263; H04L 638/0272; H04L 63/0442; H04L 63/068; H04L 63/102; H04L 63/168
See application file for complete search history.

(56) References Cited

U.S. PATENT DOCUMENTS 10,511,584 B1 * 12/2019 Baer ..................... H04L 63/029
11,323,477 B1 * 5/2022 Kumar .................. H04L 63/168
11,483,285 B2 10/2022 Tang
11,755,381 B1 * 9/2023 Hart ...................... G06F 9/5072
718/104

(Continued)

OTHER PUBLICATIONS

Cittadini et al., "BeyondCorp Part III: The Access Proxy," Usenix, The Advanced Computing Systems Association, Winter 2016, vol. 41, No. 4, Dec. 4, 2016.

(Continued)

*Primary Examiner* — Chau Le
(74) *Attorney, Agent, or Firm* — Rabin & Berdo, P.C.

(57) ABSTRACT

Disclosed herein are an apparatus and method for managing cloud computing infrastructure access based on dynamic parallel nodes. The apparatus for managing cloud computing infrastructure access based on dynamic parallel nodes may be configured to configure at least two of multiple compute nodes included in a computing infrastructure as representative nodes at preset intervals, validate, by the representative nodes, a user with respect to a remote command requested by the user for the computing infrastructure, and forward the remote command requested by a validated user to a target compute node included in the computing infrastructure.

20 Claims, 10 Drawing Sheets

(56) References Cited

U.S. PATENT DOCUMENTS

2011/0314532 A1* 12/2011 Austin ................ H04L 63/0892
726/8
2014/0033266 A1* 1/2014 Kim ........................ G06F 21/00
726/1

OTHER PUBLICATIONS

Diego Ongaro and John Ousterhout, "In Search of an Understandable Consensus Algorithm," 2014 USENIX Annual Technical Conference, The Advanced Computing Systems Association, Philadelphia, PA, Jun. 2014.

* cited by examiner

APPARATUS AND METHOD FOR MANAGING CLOUD COMPUTING INFRASTRUCTURE ACCESS BASED ON DYNAMIC PARALLEL NODES

CROSS REFERENCE TO RELATED APPLICATION

This application claims the benefit of Korean Patent Application No. 10-2024-0031876, filed Mar. 6, 2024, which is hereby incorporated by reference in its entirety into this application.

BACKGROUND OF THE INVENTION

1. Technical Field

The present disclosure relates generally to cloud computing technology, and more particularly to technology for managing cloud computing infrastructure access based on dynamic parallel nodes.

2. Description of the Related Art

Through computing paradigms such as cloud computing and server virtualization, it is possible to configure a computing infrastructure composed of multiple on-demand compute nodes (e.g., various types of nodes such as virtual machines, containers, container runtimes, and computing instances). To remotely access the compute nodes configured in this way and execute commands thereon (i.e., access and command execution based on a protocol such as secure shell (SSH) or remote desktop protocol (RDP)), it is necessary to know an access address (such as an IP address, port number, etc.) and to have an appropriate authentication key according to the access protocol. Generally, when compute nodes do not need to be connected to an external system, such as the Internet, and to be exposed, the compute nodes are connected only to a private network (e.g., a private subnet) to block external networks, thus allowing only compute nodes connected to the private network to communicate with each other. However, the compute nodes present in the private network also need to allow an administrator to remotely access and control the compute nodes so as to perform settings, control, etc.

However, when a public IP address is exposed on the Internet, the corresponding compute node may continuously become a target for attacks, and an access address and an access key may be stolen even by an internal employee affiliated with the operator. In this case, a principal computing infrastructure present in a significant private network may be intimidated. Typically, when public cloud computing-based infrastructure services are used, a private computing infrastructure and a virtual private network (VPN) may be configured to create a secure channel similar to a dedicated network, thus making access to the compute node at a remote place and issuing commands to the compute node. In this case, this is safer than being directly exposed to the internet, but a cost associated with using a VPN or the dedicated network should be paid. Similarly, when one access address and access key are internally or externally stolen, the corresponding compute node may encounter attacks that are not known even by the administrator. In this way, conventional technology accesses and controls the compute node at a remote place, wherein the compute node has a large difficulty from the standpoint of remote security.

Meanwhile, U.S. Patent No. U.S. Pat. No. 11,323,477 entitled "Establishing secure connections to instances in private subnets of a cloud provider network" discloses a connection component for a cloud compute instance, in which a user establishes a Secure Shell (SSH) connection with a compute instance executed in a private subnet within a virtual private network of a cloud provider network.

SUMMARY OF THE INVENTION

Accordingly, the present disclosure has been made keeping in mind the above problems occurring in the prior art, and an object of the present disclosure is to provision and manage a cloud computing infrastructure that utilizes various types of clouds, and improve secure access to the provisioned computing infrastructure.

Another object of the present disclosure is to dynamically extend nodes depending on a cloud access level and enhance security by mutually validating the nodes.

A further object of the present disclosure is to allow an authenticated and authorized user to freely access nodes and request the nodes to process commands at an external place without passing through a Virtual Private Network (VPN) or a dedicated network.

In accordance with an aspect of the present disclosure to accomplish the above objects, there is provided an apparatus for managing cloud computing infrastructure access based on dynamic parallel nodes, including one or more processors, and memory configured to store at least one program that is executed by the one or more processors, wherein the at least one program is configured to configure at least two of multiple compute nodes included in a computing infrastructure as representative nodes at preset intervals, validate, by the representative nodes, a user with respect to a remote command requested by the user for the computing infrastructure, and forward the remote command requested by a validated user to a target compute node included in the computing infrastructure.

The at least one program may be configured to configure the representative nodes in a multi-layer structure.

The at least one program may be configured to determine that validation of the user has succeeded only when the remote command is forwarded to the target compute node through the representative nodes configured in the multi-layer structure.

The at least one program may be configured to set a time window for an accepted request time interval for the remote command with respect to the representative nodes.

The at least one program may be configured to determine that validation of the user has succeeded only when the remote command is requested from representative nodes within the time window.

The at least one program may be configured to set an accepted number of requests corresponding to the remote command requested from the representative nodes within the time window.

The at least one program may be configured to determine that validation of the user has succeeded only when a remote command corresponding to the accepted number of requests is requested from the representative nodes within the time window.

The at least one program may be configured to set a request sequence related to an order in which the remote command is requested from the representative nodes.

The at least one program may be configured to determine that validation of the user has succeeded only when the order in which the remote command is requested from the representative nodes depending on the request sequence matches the set request sequence.

The at least one program may be configured to convert the remote command of the user into a command format corresponding to the target compute node using information stored in a command mapping database.

In accordance with an aspect of the present disclosure to accomplish the above objects, there is provided a method for managing cloud computing infrastructure access based on dynamic parallel nodes, including configuring at least two of multiple compute nodes included in a computing infrastructure as representative nodes at preset intervals, validating, by the representative nodes, a user with respect to a remote command requested by the user for the computing infrastructure, and forwarding the remote command requested by a validated user to a target compute node included in the computing infrastructure.

Configuring as the representative nodes may include configuring the representative nodes in a multi-layer structure.

Validating the user may include determining that validation of the user has succeeded only when the remote command is forwarded to the target compute node through the representative nodes configured in the multi-layer structure.

Configuring as the representative nodes may include setting a time window for an accepted request time interval for the remote command with respect to the representative nodes.

Validating the user may include determining that validation of the user has succeeded only when the remote command is requested from representative nodes within the time window.

Configuring as the representative nodes may further include setting an accepted number of requests corresponding to the remote command requested from the representative nodes within the time window.

Validating the user may include determining that validation of the user has succeeded only when a remote command corresponding to the accepted number of requests is requested from the representative nodes within the time window.

Configuring as the representative nodes may include setting a request sequence related to an order in which the remote command is requested from the representative nodes.

Validating the user may include determining that validation of the user has succeeded only when the order in which the remote command is requested from the representative nodes depending on the request sequence matches the set request sequence.

Forwarding the remote command may include converting the remote command of the user into a command format corresponding to the target compute node using information stored in a command mapping database.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF THE PREFERRED EMBODIMENTS

Figure 1:
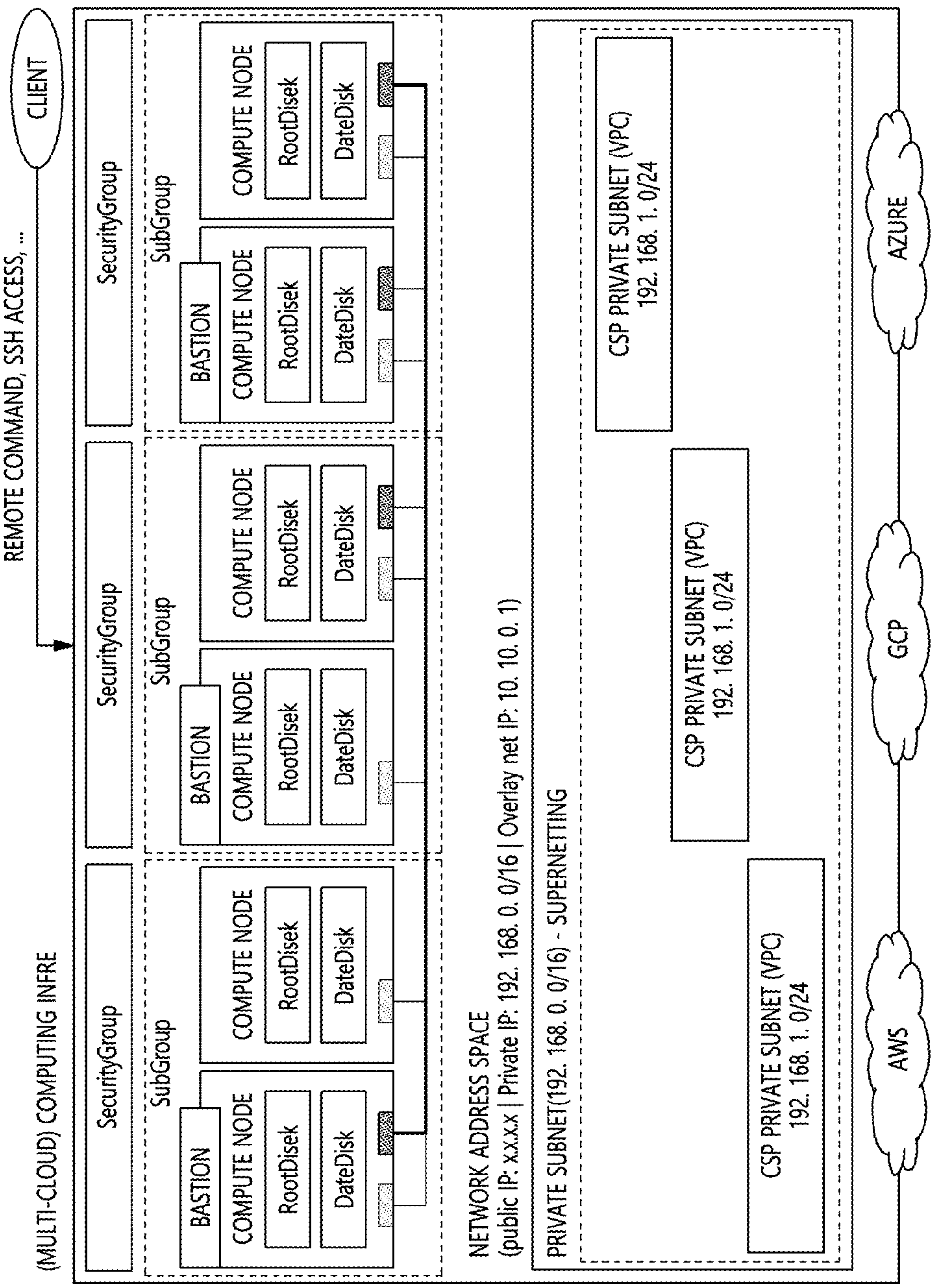
FIG. 1 is a diagram illustrating a multi-cloud computing infrastructure according to an embodiment of the present disclosure.

The present disclosure will be described in detail below with reference to the accompanying drawings. Repeated descriptions and descriptions of known functions and configurations which have been deemed to make the gist of the present disclosure unnecessarily obscure will be omitted below. The embodiments of the present disclosure are intended to fully describe the present disclosure to a person having ordinary knowledge in the art to which the present disclosure pertains. Accordingly, the shapes, sizes, etc. of components in the drawings may be exaggerated to make the description clearer.

In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Hereinafter, embodiments of the present disclosure will be described in detail with reference to the attached drawings.

FIG. 1 is a diagram illustrating a multi-cloud computing infrastructure according to an embodiment of the present disclosure.

Referring to FIG. 1, a provisioned multi-cloud computing infrastructure according to an embodiment of the present disclosure is illustrated.

The multi-cloud computing infrastructure is implemented such that multiple infrastructures including a single cloud and heterogeneous clouds are configured in a single form.

In the multi-cloud computing infrastructure, networks (VPC and Subnet), compute nodes, a security group, a disk of compute nodes, etc. may be freely and dynamically configured. SubGroup may be logically configured in the form of a cluster including compute nodes and bastion nodes mutually connected to each other through an internal network.

Each of the compute nodes and the bastion nodes may include a root disk (RootDisk) and a data disk (DataDisk).

Further, the multi-cloud computing infrastructure may configure a representative node for an interface that is connected to the outside over the Internet or that can be connected to a specific location through a VPN or the like.

The representative node may be referred to as a bastion node. After the administrator accesses the multi-cloud computing infrastructure through the bastion node, the administrator may newly access another compute node connected through a subnet within the bastion node, and may then perform control. A system which performs this action may be referred to as a jump host.

The multi-cloud computing infrastructure may support the on-demand creation of computing resources as needed.

Here, when the cloud-based computing infrastructure is configured, the multi-cloud computing infrastructure may configure a bastion node in which a specific private infrastructure that is exposed to the external Internet by allocating a public IP address or that has an administrator through a Virtual Private Network (VPN) service is connected to a dedicated secure network.

The provisioned multi-cloud computing infrastructure may provide status management and lifecycle control in an integrated manner for a computing infrastructure unit, a subgroup unit, an individual node unit, etc.

The provisioned multi-cloud computing infrastructure may manage the lifecycle status of the computing infrastructure such as an operating state, stop state, and a termination state.

The provisioned multi-cloud computing infrastructure may determine whether the lifecycle of each compute node is identical to the lifecycle of the actual computing instance managed by the cloud service provider, synchronize the lifecycles, and correct errors.

Further, the provisioned multi-cloud computing infrastructure may include functions of performing and managing stop, resume, restart, and terminate operations, and the like.

Figure 2:
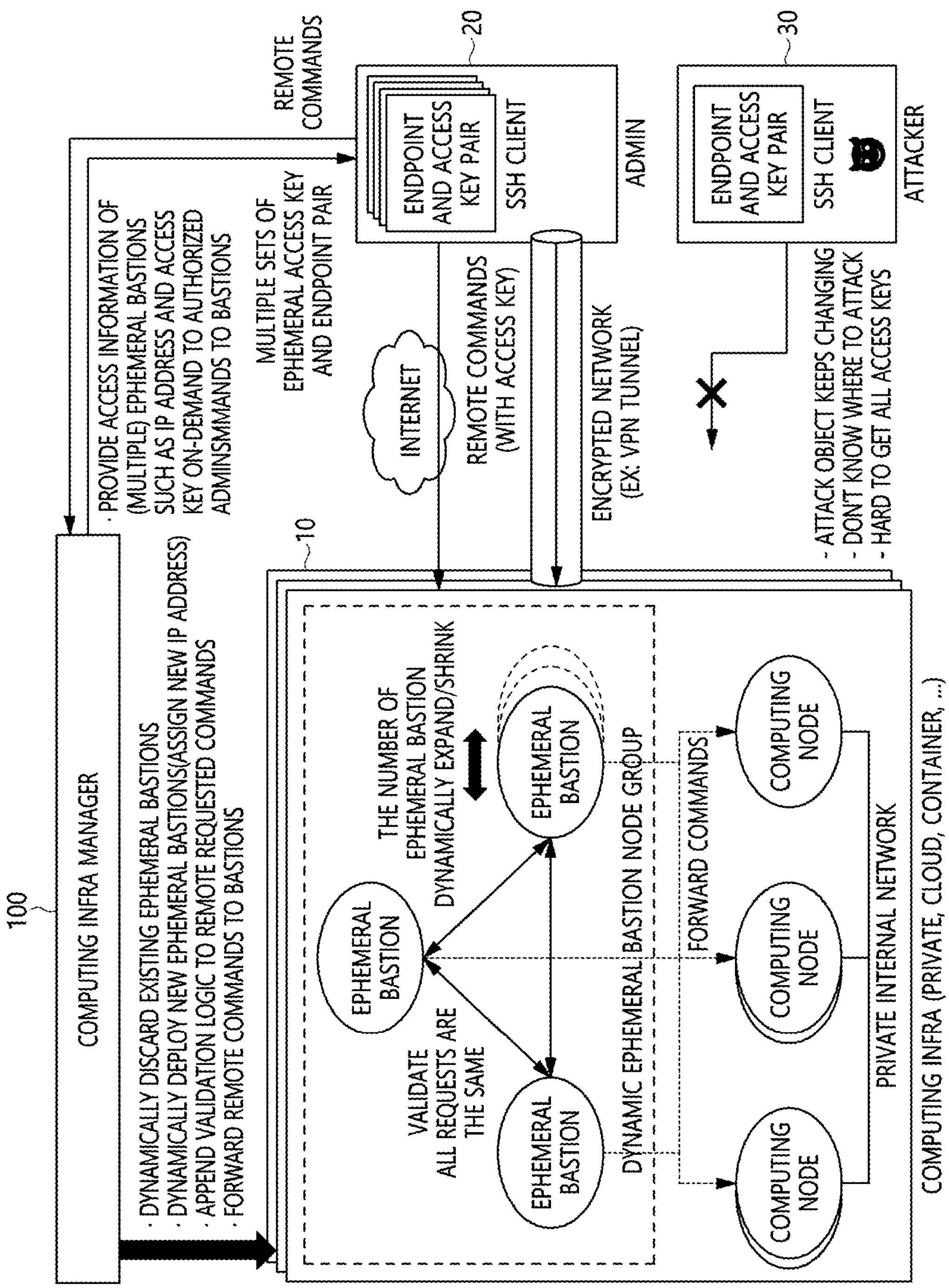
FIG. 2 is a block diagram illustrating a system for managing cloud computing infrastructure access based on dynamic parallel nodes according to an embodiment of the present disclosure.

FIG. 2 is a block diagram illustrating a system for managing cloud computing infrastructure access based on dynamic parallel nodes according to an embodiment of the present disclosure.

Referring to FIG. 2, an apparatus 100 for managing cloud computing infrastructure access based on dynamic parallel nodes (also referred to as a computing infrastructure manager 100) may dynamically designate bastion nodes in a bastion node group 10 so as to remotely access a compute node or a service connected to a private network in a computing infrastructure distributed by a user, or remotely issue a command to the compute node or the service.

Here, the apparatus 100 for managing cloud computing infrastructure access based on dynamic parallel nodes may configure the bastion node group 10 to form ephemeral bastion nodes without manually placing only one bastion node.

Here, the apparatus 100 for managing cloud computing infrastructure access based on dynamic parallel nodes may cause a malicious attacker to lose an attack target by dynamically controlling the number of bastion nodes included in the bastion node group 10 as needed, thus maximizing access security.

Here, the apparatus 100 for managing cloud computing infrastructure access based on dynamic parallel nodes may mutually validate whether the bastion node group 10 receives the same request from an administrator 20 or the attacker 30, and may process a requested remote command to prevent the requested remote command from being executed when not all bastion nodes and their security keys are known, thus improving security.

Also, each bastion node maintained for a long time is more likely to continuously undergo external attacks and intrusion attempts.

Accordingly, the apparatus 100 for managing cloud computing infrastructure access based on dynamic parallel nodes may detect anomalies in old bastion nodes and automatically discard the corresponding nodes.

Here, the apparatus 100 for managing cloud computing infrastructure access based on dynamic parallel nodes may neutralize the existing attacks by the attacker 30 by adding an entirely new bastion node, and may prevent the attacker 30 from finding an attack target to lose the attack target itself by changing an endpoint address.

Here, the apparatus 100 for managing cloud computing infrastructure access based on dynamic parallel nodes may configure a time window for a request acceptance time point at which only an authenticated and authorized user is recognized.

Here, when the accurate request acceptance time point is not recognized, the apparatus 100 for managing cloud computing infrastructure access based on dynamic parallel nodes may securely protect private compute nodes therein so that the remote command is not propagated to the private compute nodes.

Here, the apparatus 100 for managing cloud computing infrastructure access based on dynamic parallel nodes may designate a specific time point which is known only to allowed users when higher level security is required.

Here, the apparatus 100 for managing cloud computing infrastructure access based on dynamic parallel nodes may be configured to determine whether the same request has been input as many times as the number of bastion nodes within a specific time window and to check whether the requests are made sequentially in the designated order.

Here, the apparatus 100 for managing cloud computing infrastructure access based on dynamic parallel nodes may inject laws to be kept in a time dimension.

Here, the apparatus 100 for managing cloud computing infrastructure access based on dynamic parallel nodes may deny all requests from the attacker 30 who is unaware of the sequence and time frames, and may recognize whether the attacker 30 has made an attack.

In addition, in the apparatus 100 for managing cloud computing infrastructure access based on dynamic parallel nodes, the compute nodes within the infrastructure may utilize an Operating System (OS) that becomes a basis, and the version of the OS.

Here, in the apparatus 100 for managing cloud computing infrastructure access based on dynamic parallel nodes, each bastion node or a computing infrastructure manager may convert the command so that the command is OS agnostic.

Figure 3:
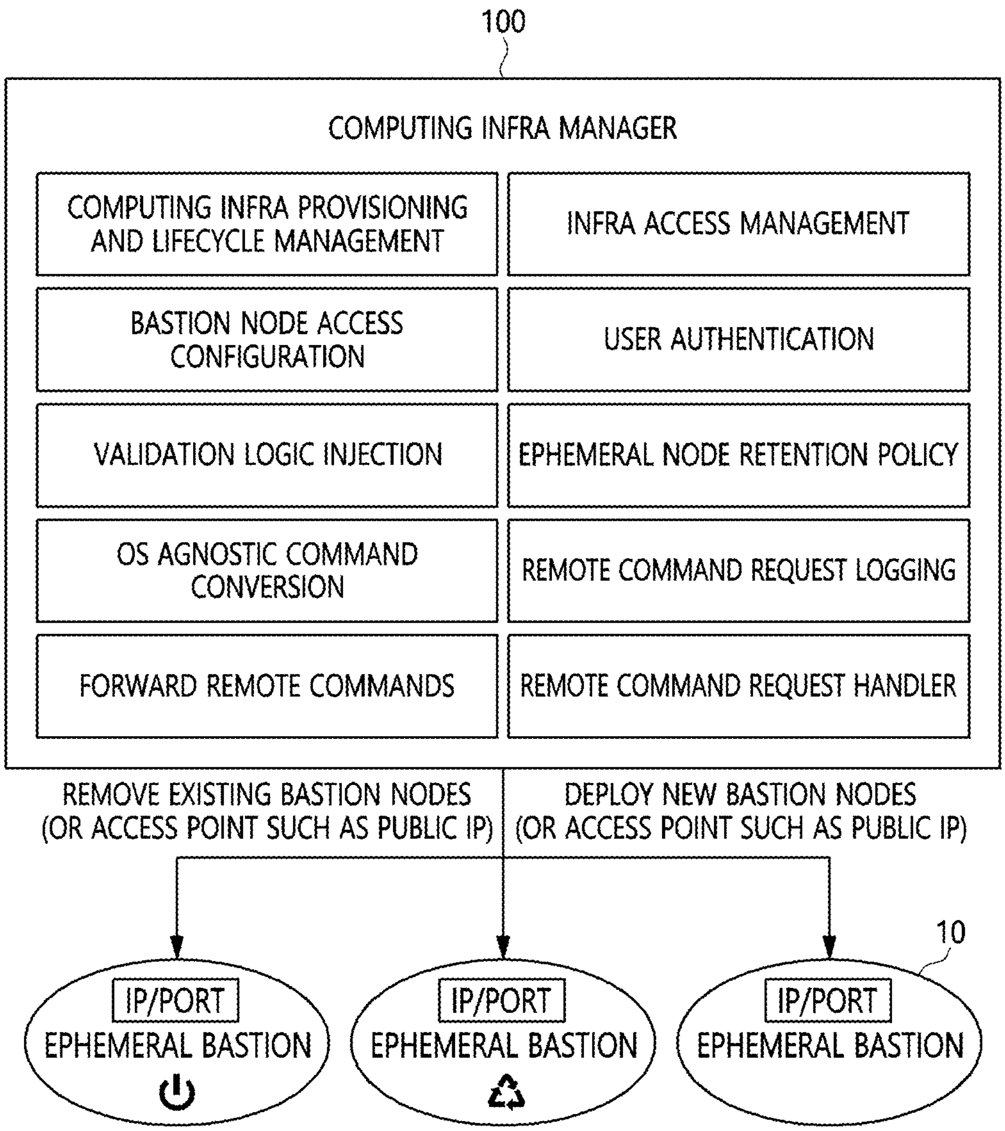
FIG. 3 is a block diagram illustrating an apparatus for managing cloud computing infrastructure access based on dynamic parallel nodes according to an embodiment of the present disclosure.
Figure 4:
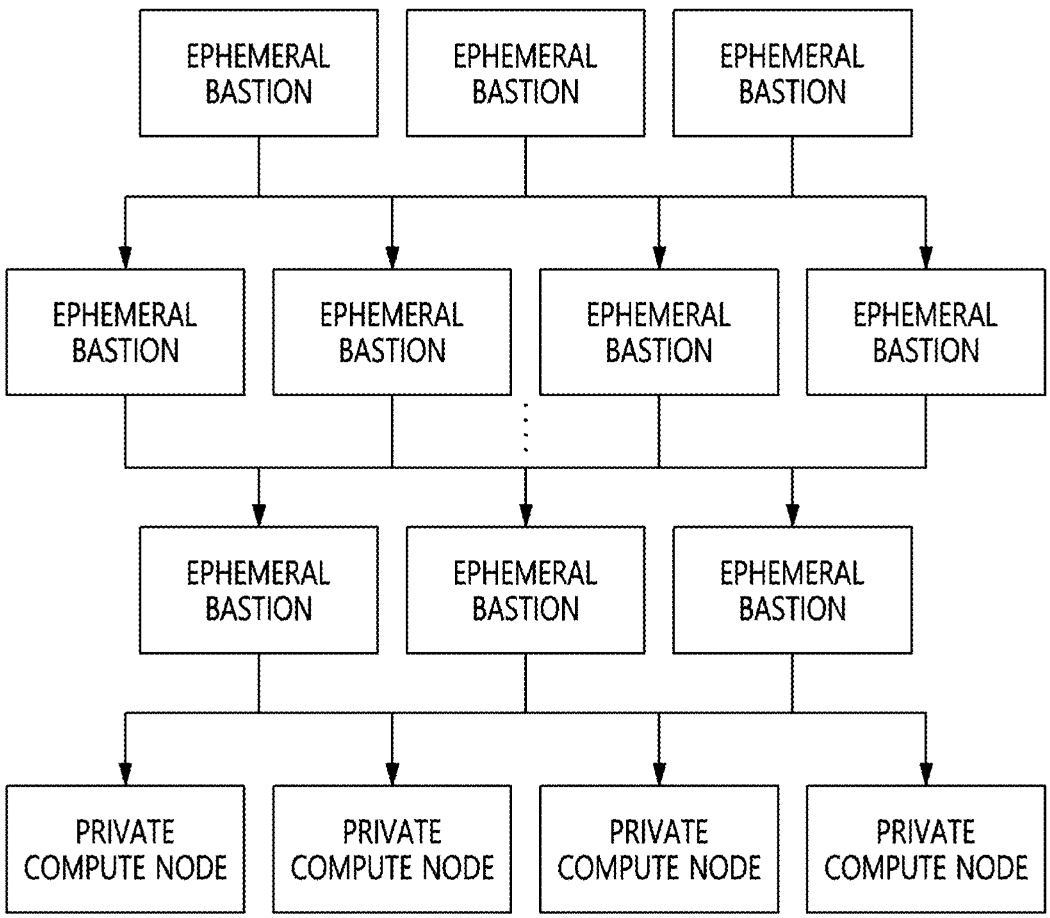
FIG. 4 is a diagram illustrating a multi-layer bastion group according to an embodiment of the present disclosure.
Figure 5:
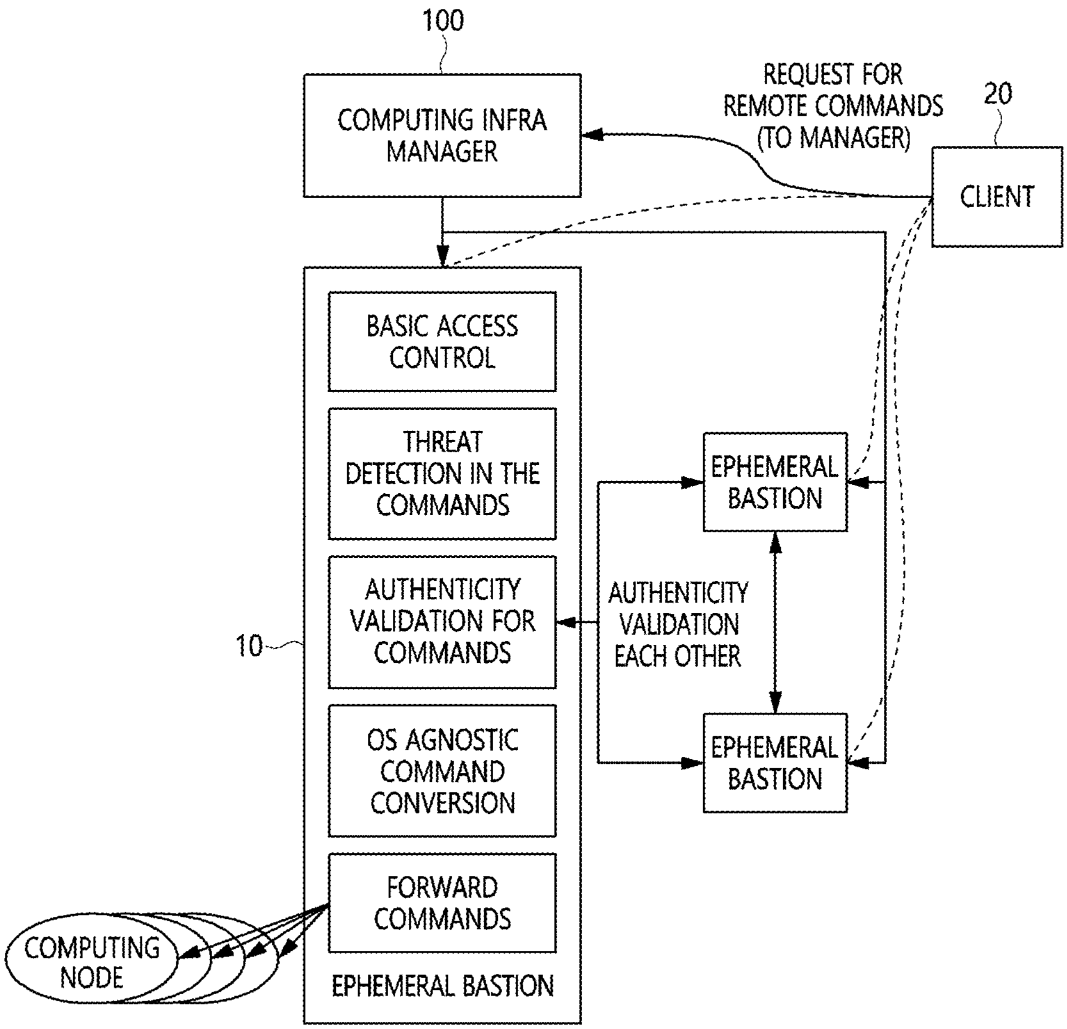
FIG. 5 is a diagram illustrating a process in which ephemeral bastions interact with each other for user request verification according to an embodiment of the present disclosure.
Figure 6:
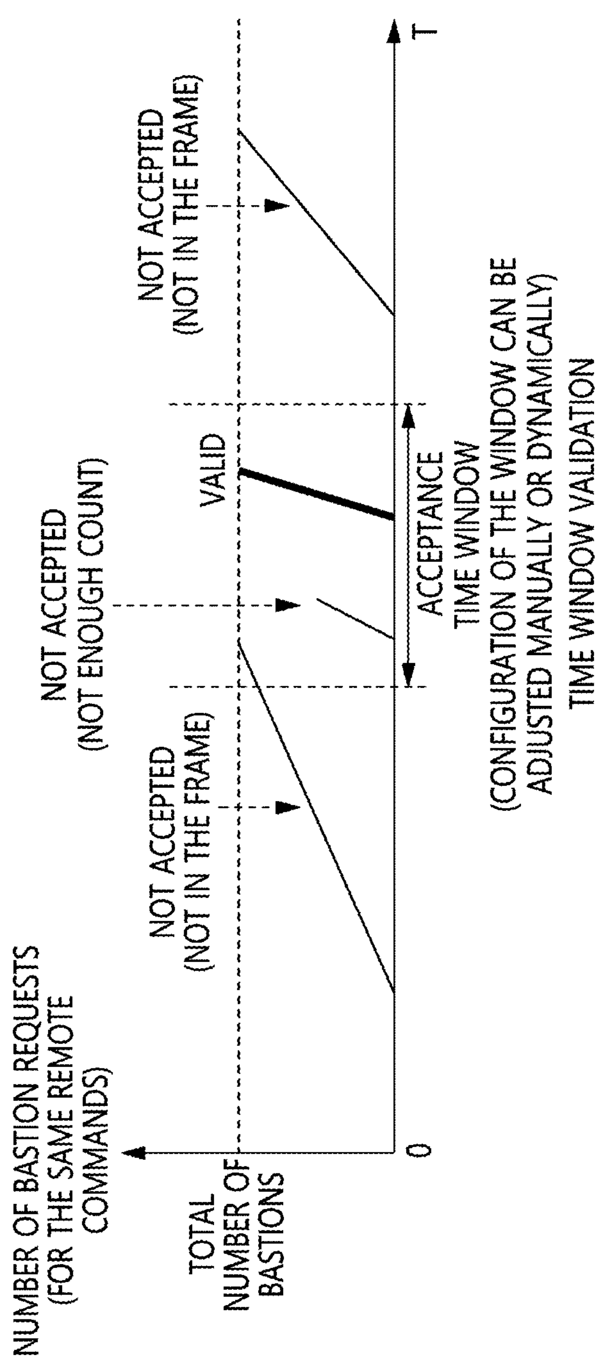
FIG. 6 is a diagram illustrating a time window validation scheme according to an embodiment of the present disclosure.
Figure 7:
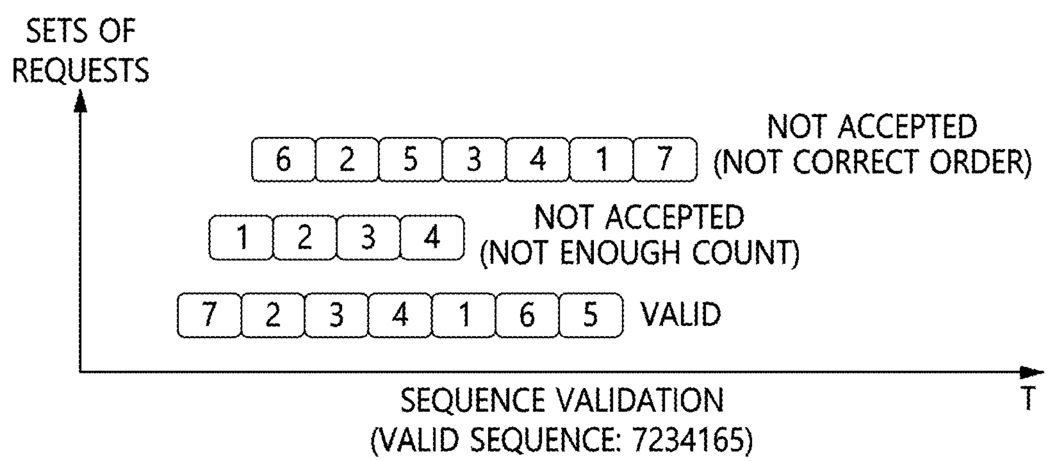
FIG. 7 is a diagram illustrating a request sequence validation scheme according to an embodiment of the present disclosure.
Figure 8:
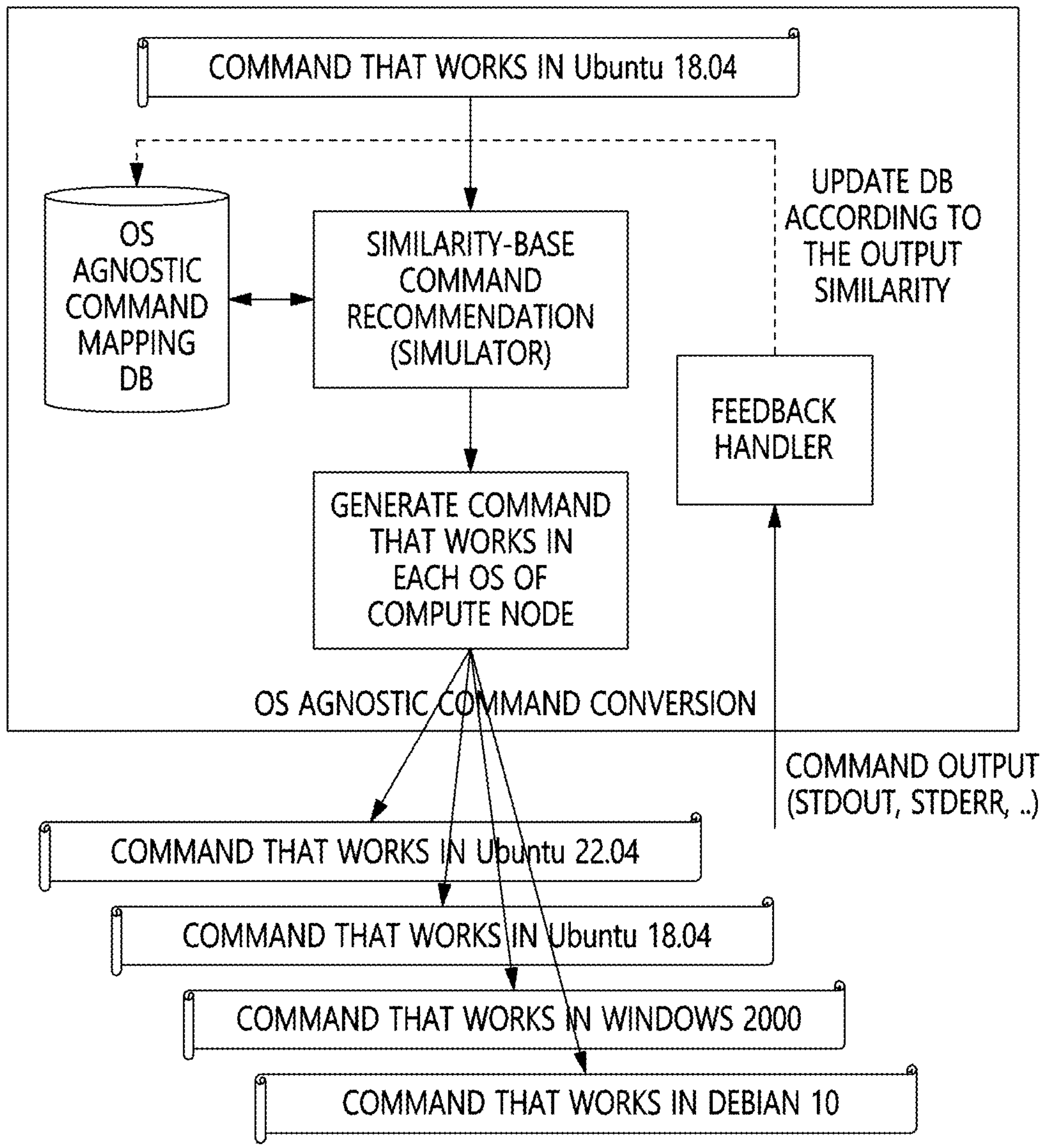
FIG. 8 is a diagram illustrating an OS agnostic command conversion process according to an embodiment of the present disclosure.

FIG. 3 is a block diagram illustrating an apparatus for managing cloud computing infrastructure access based on dynamic parallel nodes according to an embodiment of the present disclosure. FIG. 4 is a diagram illustrating a multi-layer bastion group according to an embodiment of the present disclosure. FIG. 5 is a diagram illustrating a process in which ephemeral bastions interact with each other for user request verification according to an embodiment of the present disclosure. FIG. 6 is a diagram illustrating a time window validation scheme according to an embodiment of the present disclosure. FIG. 7 is a diagram illustrating a request sequence validation scheme according to an embodiment of the present disclosure. FIG. 8 is a diagram illustrating an OS agnostic command conversion process according to an embodiment of the present disclosure.

Referring to FIG. 3, the apparatus for managing cloud computing infrastructure access based on dynamic parallel nodes according to the embodiment of the present disclosure may be configured in the form of a computing infrastructure manager or a computing infrastructure access manager (i.e., this structure is only an embodiment, and there is no need to implement the method through the corresponding structure).

The apparatus for managing cloud computing infrastructure access based on dynamic parallel nodes according to the embodiment of the present disclosure may include a computing infrastructure (infra) provisioning and management unit, a bastion node configuration unit, a validation logic injection unit, a bastion node retention policy management unit, an infrastructure access management unit, a user authentication unit, a remote command request handler, an OS agnostic command conversion unit, and a remote command request logging unit.

In the computing infrastructure provisioning and management unit, a computing infrastructure manager may provision computing resources and the infrastructure in an integrated manner based on Application Programming Interfaces (APIs) of multiple heterogeneous clouds, and may perform integrated control and management on the lifecycle of the infrastructure.

The bastion node configuration unit may designate a specific compute node as a bastion node so as to access a provisioned or configured computing infrastructure and support processing of remote commands thereon.

The bastion node configuration unit may configure at least two of the multiple compute nodes included in the computing infrastructure as bastion nodes at preset intervals.

Here, the bastion node configuration unit may configure a new compute node for a bastion purpose, and may designate the compute node as a bastion node.

The bastion node may be dynamically set at the time of creating an infrastructure, or may also be set after the infrastructure has been created.

Here, when the network IP address of a user who uses the bastion node is clearly defined, the bastion node configuration unit may specify a security group, and may more precisely restrict allowable transmission/reception network bands and access ports.

Each bastion node may be configured to be connected to compute nodes included only in a private subnet.

Here, the bastion node configuration unit may access the internal compute node through the bastion node (jump host) or request the internal compute node to process a remote command.

Here, the bastion node configuration unit may dynamically designate multiple bastion nodes, and may designate a collection of bastion nodes as a bastion group.

Here, the bastion node configuration unit may configure bastion nodes as disposable temporary (ephemeral) bastion nodes.

A bastion node maintained for a long time is more likely to continuously undergo external attacks and intrusion attempts.

Accordingly, the bastion node configuration unit may detect anomalies to automatically discard the corresponding bastion node itself.

Here, the bastion node configuration unit may neutralize existing attacks made by an attacker by adding an entirely new bastion node, and may prevent the attacker from finding an attack target to lose the attack target itself by changing an endpoint address.

Here, the bastion node configuration unit may terminate the current bastion node and designate another node as a bastion node so as to cause the attacker to lose the attack target itself.

Here, the bastion node configuration unit may change the bastion node by changing the state or shape of the bastion node in such a way as to newly reissue and set only an endpoint related to access such as IP or port.

The bastion node retention policy unit may set a time point at which the existing bastion node is removed from the bastion group and a new bastion node is configured based on the system or user policy, and may set the reference number of bastion nodes in the bastion group.

The retention policy may be defined and dynamically executed in consideration of the maintenance cost of the bastion node and required security level thereof.

For example, when higher security is required, the bastion node retention policy management unit may designate a policy so as to discard all bastion nodes that have processed at least one remote command and configure new bastion nodes.

Further, the bastion node retention policy management unit may predict the sign of an attack to probabilistically determine the attack, discard only a related bastion node, and newly reconstruct a bastion node.

In addition, the bastion node retention policy management unit may discard the corresponding bastion node and update bastion nodes even when the performance of the corresponding bastion node is deteriorated through monitoring, as well as a security-related element.

Furthermore, the bastion node retention policy management unit may declaratively define the number of bastion nodes to be maintained at a specific number.

Here, the bastion node retention policy management unit may be configured to dynamically designate the appropriate number of nodes rather than the specific number.

Similarly, as the number of bastion nodes increases, security may be maximized.

Here, as the number of nodes increases, cost may increase, and thus the bastion node retention policy management unit may adjust the size of nodes or may designate the existing compute node as a bastion node to allow the existing compute node to perform a dual function so as to reduce the cost.

Furthermore, the bastion node retention policy management unit may determine the level of intimidation, and may also designate a dynamic policy of temporarily increasing and then decreasing the number of bastion nodes only when the level of intimidation is high.

Here, the bastion node retention policy management unit may hold access information/security key pairs of all bastion nodes depending on validation logic. From the standpoint of an attacker, there is a need to acquire multiple pieces of access information, thus making it extremely difficult to attempt intrusions.

The validation logic injection unit may configure the bastion nodes as in a multi-layer structure, thus further maximizing security.

Referring to FIG. 4, it can be seen that a multi-layer bastion group according to an embodiment of the present disclosure is illustrated.

Here, in the case where the bastion group is configured as a multi-layer group, the validation logic injection unit may execute validation logic for forwarding commands to a private compute node only when the configuration of the layers is recognized.

Here, the validation logic injection unit may determine that validation has succeeded only when the remote command is forwarded to the target compute node via the bastion nodes configured in the multi-layer structure.

Here, when the multi-layer bastion group is configured, the corresponding bastion nodes may execute special validation logic for checking whether the remote command of the user and access by the user are legitimate.

Here, the validation logic may also be configured through settings when the bastion nodes are provisioned.

Here, the validation logic may be variously implemented such as initialization setting through cloud-init, setting to previously included validation logic, creation of compute nodes using a previously set image, and setting through distribution of a dedicated agent.

Here, the validation logic may be injected and set into a user request when the user request occurs (for example, the validation logic may be added as a command to an SSH command and then be forwarded to the corresponding bastion node).

The bastion nodes may mutually validate the user with respect to the remote command requested by the user for a computing infrastructure.

Here, the validation logic injection unit may process authentication of the remote command desired by the user to be executed on the compute node and validation of a legitimate request from an authorized user in a multidimensional manner.

Referring to FIG. 5, a process in which ephemeral bastions interact with each other for user request validation according to an embodiment of the present disclosure is illustrated.

A user (client) 20 may directly forward a remote command such as SSH to all bastion nodes 10, thus allowing an internal specific compute node or a compute node group to execute the corresponding remote command.

Here, each of the bastion nodes 10 may validate whether the user 20 is a legitimate user and a requested command contains any malicious intent.

All bastion nodes 10 included in the bastion group may check whether they have received the same request while exchanging requests received from the user 20 with each other.

Here, when the bastion nodes 10 do not receive the same request, the bastion nodes 10 may assume that the user is not an authenticated user or that the request is an intrusion request rather than a normal request, and may drop the request or intentionally return a falsified response value so as to confuse the attacker.

In order for the attacker to intrude into compute nodes, the attacker needs to know access information/access key pairs of all bastions and compute nodes that are the target of attack. If even one of the access information/access key pairs is incorrect, the corresponding user is detected as being an attacker.

Referring to FIG. 6, it can be seen that a time window validation scheme according to an embodiment of the present disclosure is illustrated.

The time window validation scheme may validate whether the same request from a user has been received through all bastion nodes within a time window designated by the user or the system.

When no request is received within the corresponding time window, all of the bastion nodes may determine that there is a potential threat of attack, and may take suitable security measures.

Here, the validation logic injection unit may designate the time window.

Here, the validation logic injection unit may set the time window for a request acceptance time period corresponding to the remote command with respect to the bastion nodes.

Here, the validation logic injection unit may determine that validation of the user has succeeded only when the remote command is requested from the bastion nodes within the time window.

Here, the validation logic injection unit may set the accepted number of requests for the remote command for the bastion nodes within the time window.

Here, the validation logic injection unit may determine that validation of the user has succeeded only when the remote command corresponding to the accepted number of requests is requested from the bastion nodes within the time window.

Here, the validation logic injection unit may dynamically set the size and location of the time window in consideration of a desired security level, a current security threat, etc.

For example, when it is currently analyzed that there are a number of security threats, the validation logic injection unit may set the size of the time window to be very small and frequently change the location of the time window. By means of this operation, a higher level of security validation in an additional dimension (time on) may be performed.

As shown in FIG. 6, it may be determined that validation is effective only when the request is called to a valid number of bastion nodes during the interval of a preset valid time window (acceptance time window).

When the number of called bastion nodes is less than the preset number of bastion nodes even in the valid time window in which the request for the bastion nodes is accepted, it is determined that validation is not effective, and the corresponding request may be dropped or, alternatively, a falsified response value may be intentionally returned to the attacker to confuse the attacker.

Referring to FIG. 7, a request sequence validation scheme according to an embodiment of the present disclosure may be illustrated.

The request sequence validation scheme may validate whether an authenticated and authorized user has called a remote command request to bastion nodes according to a set order.

Here, the validation logic injection unit may set a request sequence related to the order in which the remote command is requested from the bastion nodes.

Here, the validation logic injection unit may determine that validation of the user has succeeded only when the order in which the remote command is requested from the bastion nodes according to the request sequence matches the set request sequence.

Here, the validation logic injection unit may set a request sequence related to the order in which the remote command is requested from the bastion nodes within the time window.

Here, the validation logic injection unit may determine that validation of the user has succeeded only when the order in which the remote command is requested from the bastion nodes according to the request sequence matches the set request sequence within the time window.

Because the attacker does not know the order in which bastion nodes present in the bastion group are to be called, it is impossible to intrude into the corresponding bastion node even if access information is merely stolen.

As shown in FIG. 7, the valid request sequence is 7, 2, 3, 4, 1, 6, and 5, and it can be seen that validation has succeeded only when bastion nodes with seven numbers designated are to be called in the order of 7, 2, 3, 4, 1, 6, and 5.

The order of 1, 2, 3, and 4 or the order of 6, 2, 5, 3, 4, 1, and 7 may be determined to be an invalid request sequence, with the result that the corresponding request may be dropped or, alternatively, a falsified response value may be intentionally returned to the attacker so as to confuse the attacker.

After the computing infrastructure has been provisioned, the infrastructure access management unit may provide access information of compute nodes included in the computing infrastructure to the user.

The access information may include access addresses, access methods, access keys, bastion information, etc. of all compute nodes including the bastion nodes.

A user authentication unit may allow only a legitimate user to request access information through authentication and authorization. When the user receives the access information, SSH or the like may be performed based on the access information.

A compute node included only in a private network needs to be remotely accessed or needs to transmit a command by making a jump host connection (e.g., a scheme for adding an SSH command to the SSH to overlap the SSH) through the corresponding bastion node using a designated method.

A remote command request handler may forward a remote command requested by the validated user to a target compute node included in the computing infrastructure.

Here, the remote command request handler may forward the command depending on a designated validation method so as to perform validation in the bastion node instead of the bastion node, or so as to prevent any problems from occurring at the time of performing validation between bastion nodes.

Here, the remote command request handler may be configured such that, when the command is forwarded, an OS agnostic command conversion unit performs command conversion as needed.

The OS agnostic command conversion unit may perform command conversion so that the same command is executed on compute nodes having different OSs.

Here, the OS agnostic command conversion unit may convert the remote command from the user in the format of a command corresponding to a target compute node using information stored in a command mapping database (DB).

Finally, the remote command request handler may handle the request from the user to allow each bastion node to forward the request to the corresponding compute node by forwarding the request to all related bastion nodes (forward remote commands).

In the case where compute nodes are based on different OSs or environments when the user requests a remote command from compute nodes in the form of a command working on a specific OS, there is a high likelihood that the corresponding command will not work.

Referring to FIG. 8, an OS agnostic command conversion process according to an embodiment of the present disclosure is illustrated.

The OS agnostic command conversion unit may configure an OS agnostic command mapping DB from key commands for respective OSs, and may convert the command of a source OS into the command of a target OS based on information stored in the OS agnostic command mapping DB.

Here, the OS agnostic command conversion unit may provide a command recommender (simulator) for collecting and analyzing information in the OS agnostic command mapping DB, an external DB or the Internet web and converting the information into a suitable command.

In particular, the command simulator may configure an optimal command and then set up temporary simulators for respective OS environments to proactively validate whether a recommended command can work.

Here, the OS agnostic command conversion unit may allocate the validated command to each compute node, thus allowing all compute nodes to execute the corresponding command to be OS agnostic.

Here, the OS agnostic command conversion unit may allow the user to confirm the converted command in advance and forward the command to the corresponding compute node if necessary.

As shown in FIG. 8, it can be seen that the command recommender (simulator) converts Ubuntu 18.04 command into Ubuntu 22.04, Ubuntu 18.04, Windows 2000, and Debian 10 commands based on the OS agnostic command mapping DB.

A feedback handler may update the OS agnostic command mapping DB by feeding back the results of command conversion and the results of command output (stdout, stderr, or the like).

A remote command request logging unit may store and manage the request and result of the remote command by the user, the result of validation, etc. through logging.

Here, the remote command request logging unit may analyze and utilize the degree of system attack threats or the like for various policy establishment.

Figure 9:
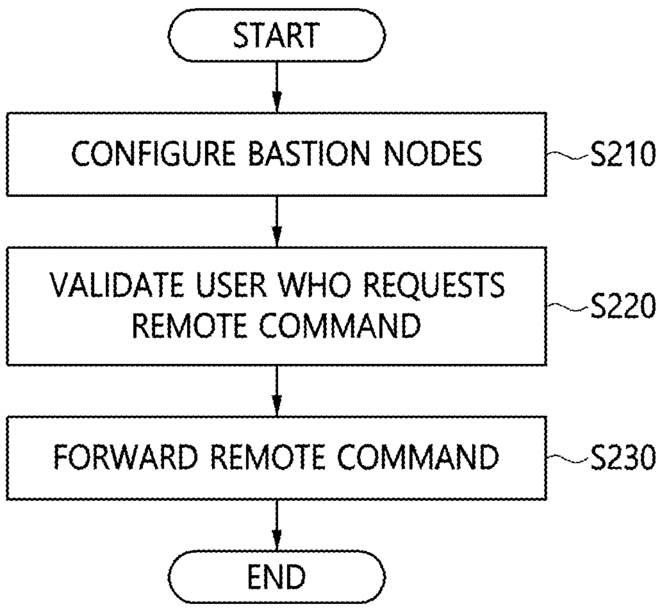
FIG. 9 is an operation flowchart illustrating a method for managing cloud computing infrastructure access based on dynamic parallel nodes according to an embodiment of the present disclosure.

FIG. 9 is an operation flowchart illustrating a method for managing cloud computing infrastructure access based on dynamic parallel nodes according to an embodiment of the present disclosure.

Referring to FIG. 9, the method for managing cloud computing infrastructure access based on dynamic parallel nodes according to an embodiment of the present disclosure may configure bastion nodes at step S210.

That is, at step S210, at least two of the multiple compute nodes included in a computing infrastructure may be configured as bastion nodes at preset intervals.

Here, step S210 may be performed to designate a specific compute node as a bastion node so as to access a provisioned or configured computing infrastructure and support processing of remote commands thereon.

Here, step S210 may be performed to configure a new compute node for a bastion purpose and designate the new compute node as the bastion node.

The bastion node may be dynamically set at the time of creating an infrastructure, or may also be set after the infrastructure has been created.

Here, step S210 may be performed to, when the network IP address of a user who uses the bastion node is clearly defined, specify a security group, and more precisely restrict allowable transmission/reception network bands and access ports.

Each bastion node may be configured to be connected to compute nodes included only in a private subnet.

Here, step S210 may be performed to access the internal compute node through the bastion node (jump host) or request the internal compute node to process a remote command.

Here, step S210 may be performed to dynamically designate multiple bastion nodes, and to designate a collection of bastion nodes as a bastion group.

Here, step S210 may be performed to configure bastion nodes as disposable temporary (ephemeral) bastion nodes.

A bastion node maintained for a long time is more likely to continuously undergo external attacks and intrusion attempts.

Accordingly, step S210 may be performed to detect anomalies to automatically discard the corresponding bastion node itself.

Here, step S210 may be performed to neutralize existing attacks made by an attacker by adding an entirely new bastion node, and prevent the attacker from finding an attack target to lose the attack target itself by changing an endpoint address.

Here, step S210 may be performed to terminate the current bastion node and designate another node as a bastion node so as to cause the attacker to lose the attack target itself.

Here, step S210 may be performed to change the bastion node by changing the state or shape of the bastion node in such a way as to newly reissue and set only an endpoint related to access such as IP or port.

Here, step S210 may be performed to set a time point at which the existing bastion node is removed from the bastion group and a new bastion node is configured based on the system or user policy, and set the reference number of bastion nodes in the bastion group.

The retention policy may be defined and dynamically executed in consideration of the maintenance cost of the bastion node and required security level thereof.

Here, step S210 may be performed to, when higher security is required, designate a policy so as to discard all bastion nodes that have processed at least one remote command and configure new bastion nodes.

Here, at step S210, the sign of an attack may be predicted to probabilistically determine the attack, only a related bastion node may be discarded, and a bastion node may be newly reconstructed.

Here, at step S210, it may be possible to discard the corresponding bastion node and thereafter update the bastion node even when the performance of the bastion node is deteriorated through monitoring, as well as a security-related element.

Here, at step S210, the number of bastion nodes may be declaratively defined to be maintained at a specific number.

Here, step S210 may be configured to dynamically designate the appropriate number of nodes rather than the specific number.

Similarly, as the number of bastion nodes increases, security may be maximized.

Here, as the number of nodes increases, cost may increase, and thus step S210 may be performed to adjust the size of nodes or designate the existing compute node as a bastion node to allow the existing compute node to perform a dual function so as to reduce the cost.

Here, step S210 may be performed to determine the level of intimidation, and also designate a dynamic policy of temporarily increasing and then decreasing the number of bastion nodes only when the level of intimidation is high.

Here, step S210 may be performed to hold access information/security key pairs of all bastion nodes depending on validation logic. From the standpoint of an attacker, there is a need to acquire multiple pieces of access information, thus making it extremely difficult to attempt intrusions.

Here, step S210 may be performed to configure the bastion nodes as in a multi-layer structure, thus further maximizing security.

Referring to FIG. 4, it can be seen that a multi-layer bastion group according to an embodiment of the present disclosure is illustrated.

Here, step S210 may be performed to, in the case where the bastion group is configured as a multi-layer group, create validation logic for forwarding commands to a private compute node only when the configuration of the layers is recognized.

Here, at step S210, when the multi-layer bastion group is configured, the corresponding bastion nodes may execute special validation logic for checking whether the remote command of the user and access by the user are legitimate.

Here, the validation logic may also be configured through settings when the bastion nodes are provisioned.

Here, the validation logic may be variously implemented such as initialization setting through cloud-init, setting to previously included validation logic, creation of compute nodes using a previously set image, and setting through distribution of a dedicated agent.

Here, the validation logic may be injected and set into a user request when the user request occurs (for example, the validation logic may be added as a command to an SSH command and then be forwarded to the corresponding bastion node).

Here, step S210 may be performed to, after the computing infrastructure has been provisioned, provide access information of compute nodes included in the computing infrastructure to the user.

The access information may include access addresses, access methods, access keys, bastion information, etc. of all compute nodes including the bastion nodes.

Here, step S210 may be performed to allow only a legitimate user to request access information through authentication and authorization. When the user receives the access information, SSH or the like may be performed based on the access information.

A compute node included only in a private network needs to be remotely accessed or needs to transmit a command by making a jump host connection (e.g., a scheme for adding an SSH command to the SSH to overlap the SSH) through the corresponding bastion node using a designated method.

Here, step S210 may be performed to set the time window for a request acceptance time period corresponding to the remote command to the bastion nodes.

Here, step S210 may be performed to set the accepted number of requests for the remote command for the bastion nodes within the time window.

Here, step S210 may be performed to set a request sequence related to the order in which the remote command is requested from the bastion nodes.

Here, step S210 may be performed to set a request sequence related to the order in which the remote command is requested from the bastion nodes within the time window.

Further, the method for managing cloud computing infrastructure access based on dynamic parallel nodes according to the embodiment of the present disclosure may verifies the user who requests the remote command at step S220.

That is, at step S220, the bastion nodes may validate the user for the remote command requested by the user for the computing infrastructure.

Here, step S220 may be performed to process authentication of the remote command desired by the user to be executed on the compute node and validation of a legitimate request from an authorized user in a multidimensional manner.

Here, at step S220, in the case where the bastion nodes are configured in a multi-layer structure, it may be determined that validation has succeeded only when the remote command is forwarded to a target compute node through the bastion nodes configured in the multi-layer structure.

Referring to FIG. 5, a process in which ephemeral bastions interact with each other for user request validation according to an embodiment of the present disclosure is illustrated.

At step S220, a user (client) 20 may directly forward a remote command such as SSH to all bastion nodes 10, thus allowing an internal specific compute node or a compute node group to execute the corresponding remote command.

Here, step S220 may be performed to validate whether the user 20 is a legitimate user and a requested command contains any malicious intent.

Here, at step S220, all bastion nodes 10 included in the bastion group may check whether they have received the same request while exchanging requests received from the user 20 with each other.

Here, at step S220, when the bastion nodes 10 do not receive the same request, the bastion nodes 10 may assume that the user is not an authenticated user or that the request is an intrusion request rather than a normal request, and may drop the request or intentionally return a falsified response value so as to confuse the attacker.

In order for the attacker to intrude into compute nodes, the attacker needs to know access information/access key pairs of all bastions and compute nodes that are the target of attack. If even one of the access information/access key pairs is incorrect, the corresponding user is detected as being an attacker.

Referring to FIG. 6, it can be seen that a time window validation scheme according to an embodiment of the present disclosure is illustrated.

The time window validation scheme may validate whether the same request from a user has been received through all bastion nodes within a time window designated by the user or the system.

When no request is received within the corresponding time window, all of the bastion nodes may determine that there is a potential threat of attack, and may take suitable security measures.

Here, at step S220, the time window may be designated.

Here, step S220 may be performed to dynamically set the size and location of the time window in consideration of a desired security level, a current security threat, etc.

Here, step S220 may be performed to determine that validation of the user has succeeded only when the remote command is requested from the bastion nodes within the time window.

Here, step S220 may be performed to determine that validation of the user has succeeded only when the remote command corresponding to the accepted number of requests is requested from the bastion nodes within the time window.

Here, step S220 may be performed to, when it is currently analyzed that there are a number of security threats, set the size of the time window to be very small and frequently change the location of the time window. By means of this operation, a higher level of security validation in an additional dimension (time) may be performed.

As shown in FIG. 6, step S220 may be performed to determine that validation is effective only when the request is called to a valid number of bastion nodes during the interval of a preset valid time window (acceptance time window).

Here, at step S220, when the number of called bastion nodes is less than the preset number of bastion nodes even in the valid time window in which the request for the bastion nodes is accepted, it is determined that validation is not effective, and the corresponding request may be dropped or, alternatively, a falsified response value may be intentionally returned to the attacker to confuse the attacker.

Here, step S220 may be performed to determine that validation of the user has succeeded only when the order in which the remote command is requested from the bastion nodes according to the request sequence matches the set request sequence.

Here, step S220 may be performed to determine that validation of the user has succeeded only when the order in which the remote command is requested from the bastion nodes according to the request sequence matches the set request sequence within the time window.

Referring to FIG. 7, a request sequence validation scheme according to an embodiment of the present disclosure may be illustrated.

The request sequence validation scheme may validate whether an authenticated and authorized user has called a remote command request to bastion nodes according to a set order.

Because the attacker does not know the order in which bastion nodes present in the bastion group are to be called, it is impossible to intrude into the corresponding bastion node even if access information is merely stolen.

As shown in FIG. 7, at step S220, the valid request sequence is 7, 2, 3, 4, 1, 6, and 5, and it can be seen that validation has succeeded only when bastion nodes with seven numbers designated are to be called in the order of 7, 2, 3, 4, 1, 6, and 5.

At step S220, the order of 1, 2, 3, and 4 or the order of 6, 2, 5, 3, 4, 1, and 7 may be determined to be an invalid request sequence, with the result that the corresponding request may be dropped or, alternatively, a falsified response value may be intentionally returned to the attacker so as to confuse the attacker.

Further, the method for managing cloud computing infrastructure access based on dynamic parallel nodes according to the embodiment of the present disclosure may forward the remote command at step S230.

That is, at step S230, the remote command requested by the validated user may be forwarded to the target compute node included in the computing infrastructure.

Here, step S230 may be performed to forward the command depending on a designated validation method so as to perform validation in the bastion node instead of the bastion node, or so as to prevent any problems from occurring at the time of performing validation between bastion nodes.

Here, at step S230, when the command is forwarded, an OS agnostic command conversion unit may perform command conversion as needed.

Here, step S230 may be performed to convert the remote command from the user in the format of a command corresponding to a target compute node using information stored in a command mapping database (DB).

Here, at step S230, command conversion may be performed such that the same command can be executed even on the compute nodes having different OSs.

Here, step S230 may be performed to handle the request from the user to allow each bastion node to forward the request to the corresponding compute node by forwarding the request to all related bastion nodes (forward remote commands).

In the case where compute nodes are based on different OSs or environments when the user requests a remote command from compute nodes in the form of a command working on a specific OS, there is a high likelihood that the corresponding command will not work.

Referring to FIG. 8, an OS agnostic command conversion process according to an embodiment of the present disclosure is illustrated.

Here, at step S230, key commands for respective OSs may be configured into an OS agnostic command mapping database (DB), and the command of a source OS may be converted into the command of a target OS based on the OS agnostic command mapping DB.

Here, step S230 may be performed to provide a command simulator for collecting and analyzing information in the OS agnostic command mapping DB, an external DB or the Internet web and converting the information into a suitable command.

Here, step S230 may be performed to configure the optimal command and then set up temporary simulators for respective OS environments to proactively validate whether a recommended command can be executed.

Here, step S230 may be performed to allocate the validated command to each compute node, thus allowing all compute nodes to execute the corresponding command to be OS agnostic.

Here, step S230 may be performed to allow the user to confirm the converted command in advance and forward the command to the corresponding compute node if necessary.

Referring to FIG. 8, at step S230, the command simulator may convert Ubuntu 18.04 command into Ubuntu 22.04, Ubuntu 18.04, Windows 2000, and Debian 10 commands based on the OS agnostic command mapping DB.

Here, at step S230, a feedback handler may update the OS agnostic command mapping DB by feeding back the results of command conversion and the results of command output (stdout, stderr, or the like).

Here, step S230 may be performed to store and manage the request and result of the remote command by the user, the result of validation, etc. through logging.

Here, step S230 may be performed to analyze and utilize the result of the request and execution, the validation result, etc. to establish various policies.

Figure 10:
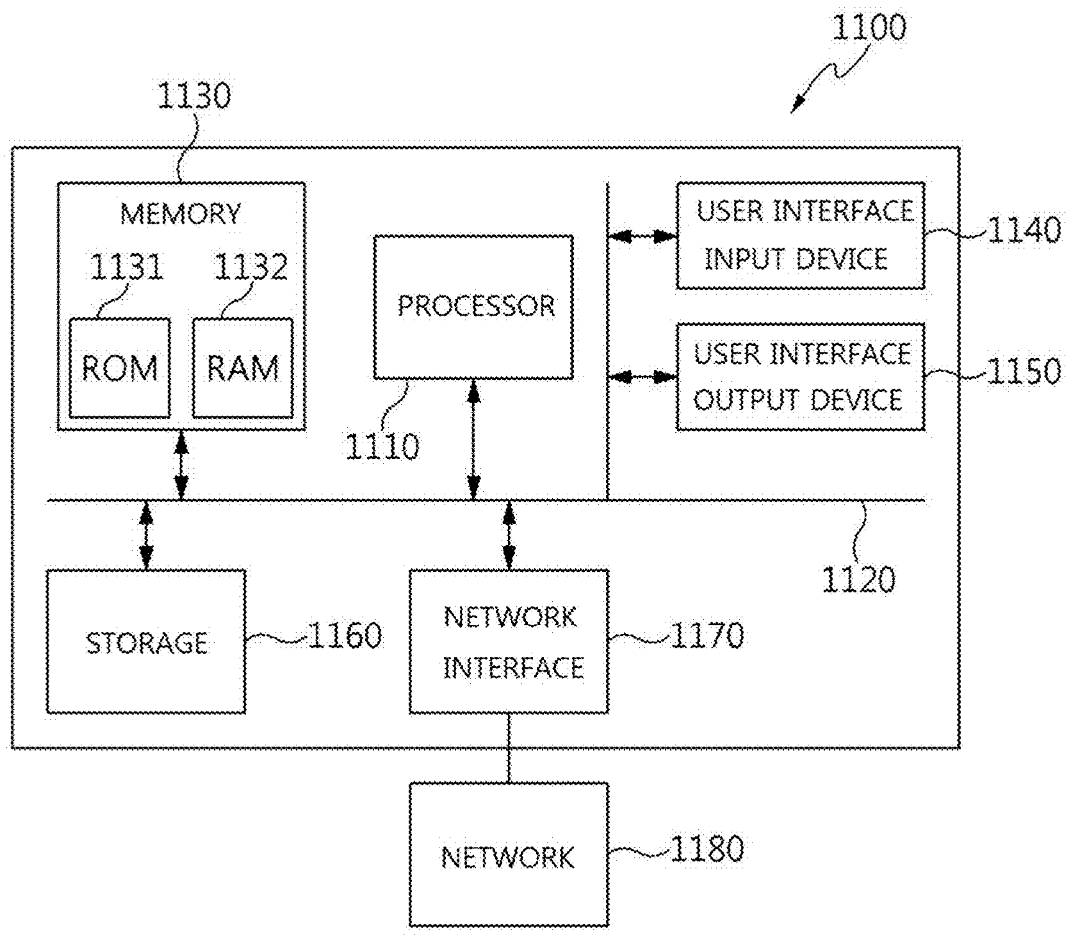
FIG. 10 is a diagram illustrating a computer system according to an embodiment of the present disclosure.

FIG. 10 is a diagram illustrating a computer system according to an embodiment of the present disclosure.

Referring to FIG. 10, an apparatus for managing cloud computing infrastructure access based on dynamic parallel nodes according to an embodiment of the present disclosure may be implemented in a computer system 1100 such as a computer-readable storage medium. As shown in FIG. 10, the computer system 1100 may include one or more processors 1110, memory 1130, a user interface input device 1140, a user interface output device 1150, and storage 1160, which communicate with each other through a bus 1120. The computer system 1100 may further include a network interface 1170 connected to a network 1180. Each processor 1110 may be a Central Processing Unit (CPU) or a semiconductor device for executing programs or processing instructions stored in the memory 1130 or the storage 1160. Each of the memory 1130 and the storage 1160 may be any of various types of volatile or nonvolatile storage media. For example, the memory 1130 may include Read-Only Memory (ROM) 1131 or Random Access Memory (RAM) 1132.

An apparatus for managing cloud computing infrastructure access based on dynamic parallel nodes according to an embodiment of the present disclosure may include one or more processors 1110, and memory 1130 configured to store at least one program that is executed by the one or more processors, wherein the at least one program is configured to configure at least two of multiple compute nodes included in a computing infrastructure as representative nodes at preset intervals, validate, by the representative nodes, a user with respect to a remote command requested by the user for the computing infrastructure, and forward the remote command requested by a validated user to a target compute node included in the computing infrastructure.

Here, the at least one program may be configured to configure the representative nodes in a multi-layer structure.

Here, the at least one program may be configured to determine that validation of the user has succeeded only when the remote command is forwarded to the target compute node through the representative nodes configured in the multi-layer structure.

Here, the at least one program may be configured to set a time window for an accepted request time interval for the remote command with respect to the representative nodes.

Here, the at least one program may be configured to determine that validation of the user has succeeded only when the remote command is requested from representative nodes within the time window.

Here, the at least one program may be configured to set an accepted number of requests corresponding to the remote command requested from the representative nodes within the time window.

Here, the at least one program may be configured to determine that validation of the user has succeeded only when a remote command corresponding to the accepted number of requests is requested from the representative nodes within the time window.

Here, the at least one program may be configured to set a request sequence related to an order in which the remote command is requested from the representative nodes.

Here, the at least one program may be configured to determine that validation of the user has succeeded only when the order in which the remote command is requested from the representative nodes depending on the request sequence matches the set request sequence.

Here, the at least one program may be configured to convert the remote command of the user into a command format corresponding to the target compute node using information stored in a command mapping database.

The present disclosure may provision and manage a cloud computing infrastructure that utilizes various types of clouds, and improve secure access to the provisioned computing infrastructure.

Further, the present disclosure may dynamically extend nodes depending on a cloud access level and enhance security by mutually validating the nodes.

Furthermore, the present disclosure may allow an authenticated and authorized user to freely access nodes and request the nodes to process commands at an external place without passing through a Virtual Private Network (VPN) or a dedicated network.

As described above, in the apparatus and method for managing cloud computing infrastructure access based on dynamic parallel nodes according to the present disclosure, the configurations and schemes in the above-described embodiments are not limitedly applied, and some or all of the above embodiments can be selectively combined and configured so that various modifications are possible.

What is claimed is:

1. An apparatus for managing cloud computing infrastructure access based on dynamic parallel nodes, comprising:

one or more processors; and a memory configured to store at least one program that is executed by the one or more processors, wherein the at least one program is configured to:

configure at least two of multiple compute nodes included in the cloud computing infrastructure as representative nodes at preset intervals, validate, by the representative nodes, a user with respect to a remote command requested by the user for the cloud computing infrastructure, and forward the remote command requested by the validated user to a target compute node included in the cloud computing infrastructure, wherein the at least one program is configured to:

check, by each of the representative nodes, whether a same request has been received from the user by exchanging requests received from the user with each other; and in response to determining that the same request has not been received by the representative nodes, return a falsified response value to the user so as to confuse a potential attacker.

2. The apparatus of claim 1, wherein the at least one program is configured to configure the representative nodes in a multi-layer structure.

3. The apparatus of claim 2, wherein the at least one program is configured to determine that validation of the user has succeeded only when the remote command is forwarded to the target compute node through the representative nodes configured in the multi-layer structure.

4. The apparatus of claim 1, wherein the at least one program is configured to set a time window for an accepted request time interval for the remote command with respect to the representative nodes.

5. The apparatus of claim 4, wherein the at least one program is configured to determine that validation of the user has succeeded only when the remote command is requested from representative nodes within the time window.

6. The apparatus of claim 4, wherein the at least one program is configured to set an accepted number of requests corresponding to the remote command requested from the representative nodes within the time window.

7. The apparatus of claim 6, wherein the at least one program is configured to determine that validation of the user has succeeded only when a remote command corresponding to the accepted number of requests is requested from the representative nodes within the time window.

8. The apparatus of claim 1, wherein the at least one program is configured to set a request sequence related to an order in which the remote command is requested from the representative nodes.

9. The apparatus of claim 8, wherein the at least one program is configured to determine that validation of the user has succeeded only when the order in which the remote command is requested from the representative nodes depending on the request sequence matches the set request sequence.

10. The apparatus of claim 1, wherein the at least one program is configured to convert the remote command of the user into a command format corresponding to the target compute node using information stored in a command mapping database.

11. A method for managing cloud computing infrastructure access based on dynamic parallel nodes, comprising:

configuring at least two of multiple compute nodes included in the cloud computing infrastructure as representative nodes at preset intervals;

validating, by the representative nodes, a user with respect to a remote command requested by the user for the cloud computing infrastructure; and forwarding the remote command requested by a validated user to a target compute node included in the cloud computing infrastructure, wherein validating the user comprises:

checking, by each of the representative nodes, whether a same request has been received from the user by exchanging requests received from the user with each other; and in response to determining that the same request has not been received by the representative nodes, returning a falsified response value to the user so as to confuse a potential attacker.

12. The method of claim 11, wherein configuring as the representative nodes comprises:

configuring the representative nodes in a multi-layer structure.

13. The method of claim 12, wherein validating the user comprises:

determining that validation of the user has succeeded only when the remote command is forwarded to the target compute node through the representative nodes configured in the multi-layer structure.

14. The method of claim 11, wherein configuring as the representative nodes comprises:

setting a time window for an accepted request time interval for the remote command with respect to the representative nodes.

15. The method of claim 14, wherein validating the user comprises:

determining that validation of the user has succeeded only when the remote command is requested from representative nodes within the time window.

16. The method of claim 14, wherein configuring as the representative nodes further comprises:

setting an accepted number of requests corresponding to the remote command requested from the representative nodes within the time window.

17. The method of claim 16, wherein validating the user comprises:

determining that validation of the user has succeeded only when a remote command corresponding to the accepted number of requests is requested from the representative nodes within the time window.

18. The method of claim 11, wherein configuring as the representative nodes comprises:

setting a request sequence related to an order in which the remote command is requested from the representative nodes.

19. The method of claim 18, wherein validating the user comprises:

determining that validation of the user has succeeded only when the order in which the remote command is requested from the representative nodes depending on the request sequence matches the set request sequence.

20. The method of claim 11, wherein forwarding the remote command comprises: converting the remote command of the user into a command format corresponding to the target compute node using information stored in a command mapping database.

* * * * *